United States Patent Office 3,306,684
Patented Feb. 28, 1967

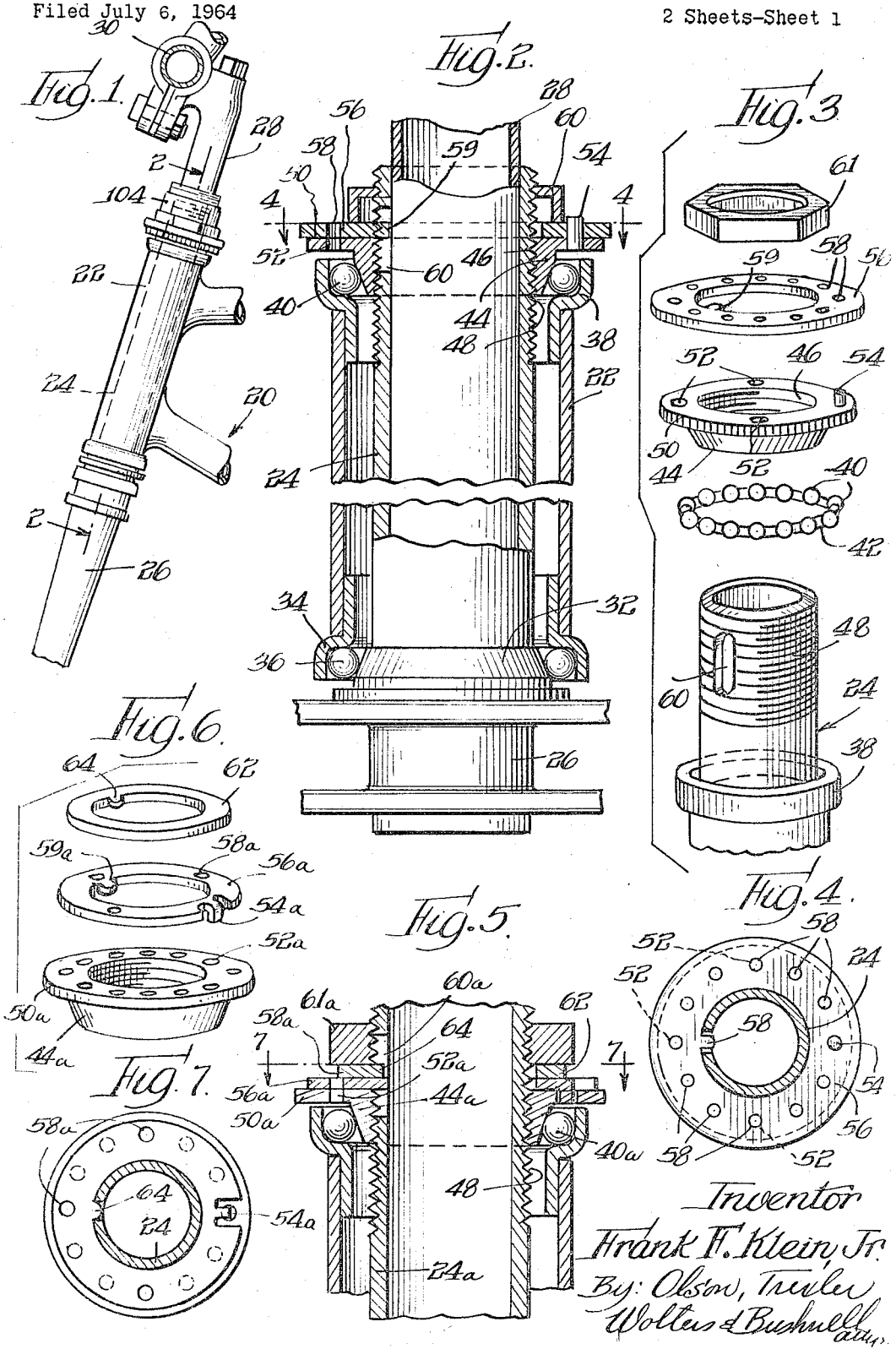

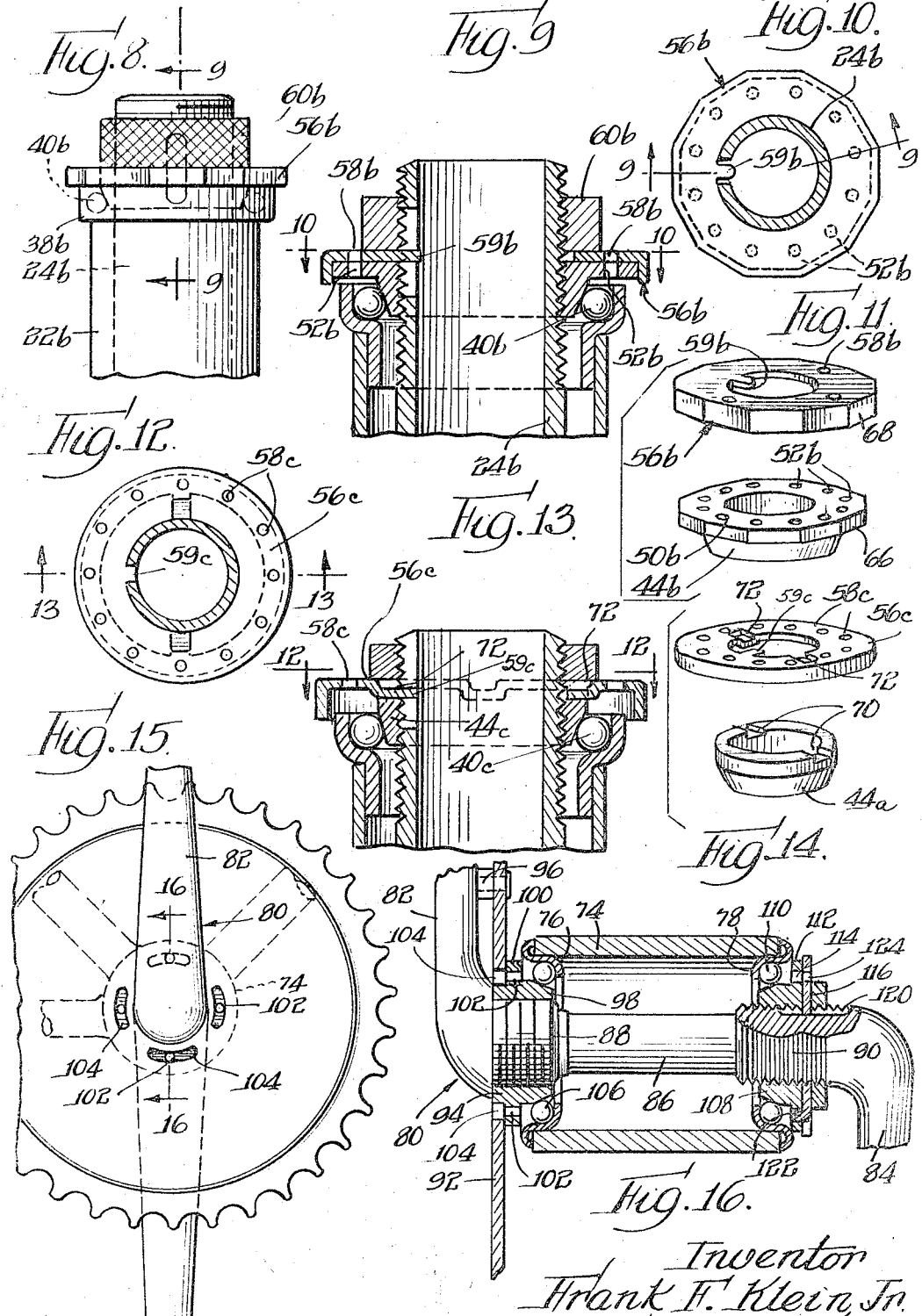

3,306,684
BEARING CONSTRUCTION FOR BICYCLES
AND THE LIKE
Frank F. Klein, Jr., 2049 W. 63rd St.,
Chicago, Ill. 60636
Filed July 6, 1964, Ser. No. 380,383
9 Claims. (Cl. 308—187)

This invention relates to the bicycle art, and more particularly to an improved washer for locking nuts in connection with rotating parts.

Bicycles are commonly built with a substantially vertical portion at the front end of the frame. The upstanding stem of the front wheel fork is journalled in this front tubular portion or head, and it is common practice to provide a ball bearing at the top thereof with a bearing cone which is threadedly adjustable as to vertical height to set the proper position for the bearing cone. A washer generally is placed on top of this bearing cone and is provided with a radially inwardly directed tongue received in a longitudinal kerf or key slot through the threads adjacent the upper end of the stem. Another nut is turned down on top of this washer. The tongue on the washer keeps the washer from rotating, and this tends to prevent the top nut and also the bearing cone from working up along the stem, and thereby loosening the bearing.

Unfortunately, bicycles are subjected to rather substantial shocks on the front wheel, and particularly when ridden hard up and down curbs by children. Thus, in spite of the best efforts of the prior art to insure fixed positioning of the bearing cone, the bearing cone does work along the stem until the bearing becomes quite loose. In fact, the entire fork and stem frequently can be jiggled around with rather considerable play in the tubular head portion at the front of the bicycle frame.

Accordingly, it is an object of this invention to provide an improved locking means for the bearing cone on the front fork stem.

More particularly, it is an object of this invention to provide a locking means for the front fork stem bearing cone which affords a positive lock coupled with a micrometer adjustment.

It is to be borne in mind that the crank assembly of a bicycle also is journalled in the crank hanger by means of ball bearings. In one particular favored type of construction the two cranks and inner connecting shaft are a one piece forging. The bearing cones are threaded into position, and are locked in much the same manner as the front fork stem bearing cone. Unfortunately, the locks heretofore available have not proved entirely effective, and the bearings have loosened.

A concomitant problem with both the front fork stem bearing cone and the crank bearing cones has been lack of lubrication.

Accordingly, it is an object of this invention to provide bearing cone locking means in a bicycle construction particularly adapted for lubrication of the bearings.

It is another object of this invention to provide bearing cone structure in bicycles for locking the bearing cones in adjusted position either on the front fork stem or on the crank shaft.

It is an object of the persent invention to provide a bearing cone locking structure wherein a washer keyed to the shaft is also keyed to the bearing cone, thereby preventing rotational threaded movement of the bearing cone on its shaft.

It is further an object of this invention to provide in bicycle construction a locking means for a bearing cone which locking means also provides access for lubrication of the bearings.

It is another object of this invention to provide coacting structure between a washer and a bearing cone in a bicycle wherein the washer and bearing cone are locked against relative rotation upon axial movement into engagement with one another, and wherein the washer is locked against rotation on the shaft on which the bearing cone is mounted.

Other and further objects and advantages of the present invention will be apparent from the following description when taken in connection with the accompanying drawings wherein:

FIG. 1 is a fragmentary side view partly in section;
FIG. 2 is a substantially vertical cross sectional view taken along the line 2—2 in FIG. 1;
FIG. 3 is an exploded perspective view of a threaded fork stem, bearing and cone and locking washer and nut in accordance with the present invention;
FIG. 4 is a horizontal cross sectional view taken substantially along the line 4—4 in FIG. 2;
FIG. 5 is a view generally similar to FIG. 2 and showing a modification of the invention;
FIG. 6 is a fragmentary exploded perspective view showing the modification of the invention according to FIG. 5;
FIG. 7 is a horizontal cross sectional view taken substantially along the line 7—7 in FIG. 5;
FIG. 8 is a fragmentary side view illustrating a further modification of the invention;
FIG. 9 is a vertical sectional view similar to FIGS. 2 and 5 and showing the embodiment of FIG. 8, being taken substantially along the line 9—9 in FIG. 8;
FIG. 10 is a horizontal sectional view taken substantially along the line 10—10 in FIG. 9;
FIG. 11 is an exploded perspective view showing parts according to the embodiment of the invention in FIGS. 8–10;
FIG. 12 is a horizontal, sectional view similar to FIGS. 4, 7 and 10, being taken substantially along the line 12—12 in FIG. 13;
FIG. 13 is a vertical sectional view taken along the line 13—13 of FIG. 12;
FIG. 14 is an exploded perspective view of the modification of the invention shown in FIGS. 12 and 13;
FIG. 15 is a side view of a portion of the pedal crank and drive sprocket with principles of the present invention applied thereto; and
FIG. 16 is a vertical sectional view taken substantially along the line 16—16 in FIG. 15.

Referring now in greater particularity to the drawings, and first to FIGS. 1–4, there will be seen a portion of a bicycle frame 20 particularly including a substantially vertical, upright forward or tubular head portion 22. The fork stem 24 secured to the fork 26 in conventional fashion is journalled within the tubular head portion as hereinafter will be set forth. A gooseneck 28 is secured within the upstanding tubular fork stem by the usual wedging device (not shown) and secures the handle bar 30 in conventional manner.

As will be apparent with particular reference to FIGS. 2 and 3, a bearing cone 32 is provided at the top of the fork 26 and about the bottom of the fork stem or tube 24. A corresponding bearing race 34 is fixed in the bottom of the tubular head 22, in accordance with the usual practice, and a plurality of ball bearings 36, preferably with the usual retainer, is placed between the bearing cone and the bearing race 34.

Similarly, at the upper end of the tubular head portion 22, there is an upwardly facing bearing race 38 secured in position. A plurality of ball bearings 40 complete with a bearing retainer 42 is received in the upwardly facing bearing race 38. A bearing cone 44 is internally threaded at 46 and is threaded onto the threaded upper end 48 of the fork stem or tube 24. The cone 44 is provided at its upper end with a radially outwardly extending flange 50.

As is the usual practice, the bearing cone 44 is turned down upon the threads 48 until it forms a close, but not binding rolling engagement with the balls 40.

An important feature of the present invention is the provision of a plurality of annularly spaced holes 52 about the flange 50 outwardly of the cone 44. In the illustrative example of the invention, there are four such holes; an upstanding pin 54 is fixed in one of these holes.

A locking washer 56 is received about the threads 48 of the fork stem or tube 24 and rests on top of the flange 50 of the bearing cone 44. This washer is provided with a radially inwardly extending tongue 59 received in a vertical slot 60 in the fork stem or tube 24. In addition, the washer 56 is provided with a plurality of annularly spaced holes 58, any one of which is capable of receiving the upstanding end of the pin 54. As will be appreciated, this locks the washer 56 to the bearing cone 44, and since the bearing cone can move vertically only by rotation, the bearing cone is firmly fixed against any movement whatsoever. A nut 61 is threaded down on top of the washer to hold the washer in place. In the present illustrative embodiment of the invention, the nut 61 is a sheet metal nut.

Raising of the washer 56 upon loosening of the nut 60 allows rotation of the bearing cone 44, and it will be appreciated that the number of holes 58 is fairly substantial, in order that the pin 54 may be received in one of such holes with only a fairly small degree of rotation of the bearing cone 44. The number of holes 58 also is related to the number of holes 52 in such manner that at least one of each of these holes will be aligned at least partially when the pin 54 is received in a hole 58. In the illustrative example, there are twelve holes 58. The reason for such alignment is that oil can be applied through an aligned hole 58 and hole 52 to the bearings 40. This allows for lubrication of these bearings, which otherwise usually run dry after the initial lubrication has been worn out or used up.

A modification of the invention is shown in FIG. 5, and similar parts therein are shown with similar numerals with the addition of the suffix $a$. Parts which are not changed in essence from those previously described are not herein described in detail. The significant distinction resides more or less in a reversal of parts with the addition of a simplified manufacturing step.

More particularly, the significant change relative to FIGS. 5–7 is that the flange 50$a$ of the bearing cone 44$a$ has a larger number of holes 52$a$. There is no pin fixed in one of these holes. On the contrary, a finger 54$a$ is struck down from the washer 56$a$, forming an integral part thereof. The number of holes 58$a$ is reduced, and specifically the holes 58$a$ correspond in number to the holes 52, while the holes 52$a$ correspond in number to the holes 58. The same micrometer adjustment is provided, and one or more of the holes 52$a$ and 58$a$ will be vertically aligned as may be seen in FIG. 5 for oiling of the bearing balls 40$a$. In addition to the foregoing, there may be provided a flat washer 62 having a radially inwardly directed tongue 64 received in the slot 60$a$ of the fork stem or tube 24$a$. The nut 61$a$ in the present instance comprises a conventional, solid hexagonal nut.

A further modification of the invention is shown in FIGS. 8–11. The parts herein are generally similar to those heretofore discussed, and again similar numerals are utilized, this time with the addition of the suffix $b$. Description of parts which are substantially unchanged therefore is unnecessary. The essential difference in the present form of the invention is that the flange 50$b$ of the bearing cone 44$b$ is provided with a noncircular periphery 66. Specifically, it is a twelve sided polyhedron. The washer 56$b$ is provided with a depending circumferential flange 68. The flange 68 of the washer is adapted to overlap the periphery of the flange 50$b$ in close fitting embracing relation therewith, whereby to lock the bearing cone and flange against rotation in the same functional manner as heretofore. The nut 60$b$ in the present instance is illustrated as being a knurled nut.

It will be observed that the number of holes 58$b$ is relatively small, illustrated as three in number, while the number of holes 52$b$ is larger. The two sets of holes are so related that they will overlap at least in part, as illustrated in FIG. 9, whereby the bearing balls 40 again can be oiled.

A further modification of the invention is illustrated in FIGS. 12–14. Similar numerals again are used with the addition of the suffix $c$, whereby repetition of description is unnecessary. In the present form of the invention the bearing cone 44$c$ does not have the radially extending flange. It is of somewhat smaller diameter, and it is provided in the top surface with a pair of diametrically spaced upwardly facing slots 70 extending radially across the entire extent of the top of the bearing cone. The washer 56$c$ is provided with complementary depressions 72. Two slots 70 and two depressions are shown, but it will be appreciated that greater numbers of each can be provided for a closer micrometer type of adjustment. The holes 58$c$ are disposed radially outwardly of the bearing cone 44$c$, whereby oil can be applied to the bearing balls 40$c$.

The principles of the invention are applicable to bearing cones other than those supporting the fork tube. Thus, in FIGS. 15 and 16 the principles of the invention are shown as applied to the pedal crank and crank hanger. The crank hanger will be seen at 74, having two sheet metal bearing races 76 and 78 pressed in the opposite ends thereof. The crank 80 is of conventional, one piece forged construction, having the opposite crank arms 82 and 84 interconnected by a shaft 86. An enlarged shaft portion adjacent the crank arm 82 is provided with right hand threads 88, and a similar enlarged portion at the opposite end is provided with left hand threads 90. The diameter of the threaded portion 88 is sufficiently greater than that of the threaded portion 90 to allow a sprocket 92 to be moved over the crank arm 84, threaded portion 90 and shaft 86 and also over the threaded portion 88 against a shoulder 94 on the crank arm 82. A stud 96 on the crank arm 82 nonrotatably locks the sprocket to the crank arm, in accordance with conventional practice. A bearing cone 98 is threaded on to the threads 88 and abuts the sprocket 92 to hold the sprocket tight against the shoulder 94.

The bearing cone is provided with a circumferential flange 100 having a plurality of arcuately spaced axially extending apertures 102 therethrough. The sprocket 92 is provided with a plurality of arcuate apertures 104, illustrated as four in number, and equally spaced arcuately about the center of rotation. There preferably are twelve of the apertures 102, and as will be seen in both FIGS. 15 and 16, certain of the apertures 102 and 104 are in alignment. Hence, oil can be applied through the aligned apertures to lubricate the bearing balls 106 (preferably having a retainer thereon, not shown) disposed between the bearing cone 98 and the bearing race 76.

A bearing cone 108 is internally left hand threaded and is threaded on to the portion 90 properly to secure in position a set of bearing balls 110, between this cone and the race 78. Preferably, these balls are provided with the usual bearing retainer (not shown). The bearing cone is provided with a circumferential flange 112 having a plurality of apertures 114 extending axially therethrough and circumferentially spaced from one another. A locking washer 116 has a radially inwardly extending tongue 118 received in an axial slot or kerf 120 in the threaded portion 90, and a turned over finger 122 on this washer locks the washer to the bearing cone, whereby the cone is locked against rotation relative to the threaded portion 90. In addition to the finger 122, there are holes 124 spaced arcuately about the locking washer 116, whereby aligned holes 114 and 124 permit oiling of the bearing balls 110.

It will now be apparent that I have disclosed structure for positively locking bearing cones in bicycles against rotation such as would allow loosening of the bearing. Thus, great danger to bicycle riders is avoided. Concomitantly, I have provided for lubrication of bearings that are usually allowed to run dry, and this leads both to longevity of the equipment and safety to the user. Various changes in structure will no doubt occur to those skilled in the art relative to the illustrative embodiments shown. For example other means can be used for locking the washer to the fork stem or tube, such as interfitting noncircular sections, instead of the radially inward tongue or protuberance shown. Other means also could be provided for locking the washer to the bearing cone, and in particular it is apparent that the holes, such as 58, could open radially outwardly of the washer, thereby being more in the nature of recesses than continuous holes. Such changes will be understood as forming a part of the present invention insofar as they fall within the spirit and scope of the appended claims.

The invention is claimed as follows:

1. A bearing construction for use as in bicycles comprising a first part and a second part to be rotatably journalled in said first part, a bearing race mounted on said first part, a plurality of bearing balls in said race, a bearing cone threaded on said second part and engaging said balls, a locking washer, one of said bearing cone and washer having a pin extending axially therefrom toward the other and the other thereof having a plurality of holes any one of which is capable of receiving said pin, said bearing cone and washer thereby being capable of relative axial movement and locked against relative rotation with said pin received in one of said holes, means coacting between said washer and said bearing cone upon relative axial movement toward one another to prevent relative rotation, said bearing cone thereby being locked to said second part against rotation relative thereto, and nut means threaded on said second part to clamp said locking washer against said bearing cone, both said washer and said bearing cone being provided with a plurality of axially extending holes, at least some of which line up with said pin received in a hole whereby to permit oiling of said bearing balls.

2. A bearing construction as set forth in claim 1 wherein said pin comprises an inserted pin.

3. A bearing construction as set forth in claim 1 wherein said pin comprises a struck out pin.

4. A bearing construction for use as in bicycles comprising a first part and a second part to be rotatably journalled in said first part, a bearing race mounted on said first part, a plurality of bearing balls in said race, a bearing cone threaded on said second part and engaging said balls, a member bearing axially against said bearing cone and having means coacting between said member and said second part to preclude relative rotation therebetween, said member and said bearing cone having a plurality of axial holes therethrough at least some of which are at all times at least partially aligned to permit introduction of oil through said holes to said bearing balls.

5. A bearing construction for use as in bicycles comprising a first part and a second part to be rotatably journalled in said first part, a bearing race mounted on said first part, a plurality of bearing balls in said race, a bearing cone threaded on said second part and engaging said balls, a locking washer, means coacting between said washer and said second part permitting relative axial movement and precluding relative rotation between said washer and said second part, means coacting between said washer and said bearing cone upon relative axial movement toward one another to prevent relative rotation, said bearing cone thereby being locked to said second part against rotation relative thereto, and nut means threaded on said second part to clamp said locking washer against said bearing cone, said washer having aperture means therein to allow introduction of oil through said washer past said bearing cone to said balls.

6. A bearing construction as set forth in claim 4, wherein said member comprises a washer, and a pin fixed in a hole of one of said member and of said bearing cone and selectively received in a hole of the other to lock said washer and said bearing cone together against relative rotation.

7. A bearing construction as set forth in claim 4, wherein said member comprises a washer having an axially struck out finger received in a hole in said bearing cone to lock said washer and said bearing cone against relative rotation.

8. A bearing construction as set forth in claim 4, wherein said bearing cone has a noncircular periphery, and wherein said member comprises a washer of like shape having a similar noncircular axially extending flange received over said cone periphery to lock said bearing cone and said washer against relative rotation.

9. A bearing construction as set forth in claim 4, wherein said second part comprises a pedal crank assembly and said member comprises a pedal sprocket, and further including a pin extending between said pedal crank assembly and said sprocket to preclude relative rotation thereof.

References Cited by the Examiner

UNITED STATES PATENTS

| | | | |
|---|---|---|---|
| 511,318 | 12/1893 | Brown | 308—191 |
| 549,750 | 11/1894 | Spornhaver | 308—189.1 |
| 697,525 | 4/1902 | McKay | 308—191 |

MARTIN P. SCHWADRON, *Primary Examiner.*

FRANK SUSKO, *Examiner.*